INVENTOR:
Kenneth Clunis
By Smyth, Roston & Pavitt
Attorneys

INVENTOR.
Kenneth Clunis
By Smyth, Roston & Pavitt
Attorneys

INVENTOR
Kenneth Clunis
By Smyth, Roston & Pavitt
Attorneys

INVENTOR:
Kenneth Clunis

By Smyth, Roston & Pavitt
Attorneys 3,427,628

THERMOPLASTIC RECORDING

Kenneth Clunis, Manhattan Beach, Calif., assignor to Minnesota Mining and Manufacturing Company, St. Paul, Minn., a corporation of Delaware Filed Aug. 15, 1962, Ser. No. 217,219
U.S. Cl. 346—1 15 Claims
Int. Cl. G01d 15/00

This case relates to a transducing system for the recording of information such as video information on a medium such as a disc or tape. More specifically, the invention relates to a transducing system using a thermoplastic material as the recording medium.

Prior art systems have used thermoplastic material to record video or high frequency information. These systems usually record the information by the direction of an electron beam toward the recording medium to produce a charge pattern on the surface of the thermoplastic material in accordance with the information and to produce surface tensions in accordance with the charge pattern. The medium is then subjected to heat to bring the thermoplastic material to a plastic state. While in the plastic state, the surface of the thermoplastic material distorts in accordance with the charge pattern to equalize the surface tension. The information is therefore recorded by producing variations in the physical dimensions of the surface of the thermoplastic material in accordance with the information.

The prior art systems use an optical system for the reproduction of the information recorded on the thermoplastic material. Light energy is directed towards the medium to be modified in accordance with the surface characteristics of the medium. More specifically, the reproducing systems use schlieren optics to produce an optical pattern of information in accordance with the deformed surface characteristics of the thermoplastic material.

Although the prior art systems have been fairly successful, they have had certain limitations. For example, the recording of the information is accomplished within a vacuum chamber since the information is provided by variations in an electron beam. Since a vacuum chamber has been required, the size and expense of the recording systems has been increased. The invention of the present application eliminates the necessity of a vacuum chamber by using a beam of energy having heating characteristics to provide a recording of the information directly on the thermoplastic material. For example a beam of infrared energy is used to directly deform the surface of the thermoplastic material in accordance with the characteristics of the infrared beam of energy, or the heating effect of the beam may be used to allow a constant charge on the surface of the thermoplastic material to deform the thermoplastic material.

The invention also includes means to preform a track on the thermoplastic material so that the information may be recorded along the preformed track by using a smaller quantity of energy than would be possible without the preformed track. The invention further includes means to obtain an accurate control over the recording of the information on the medium so that the information is recorded on the preformed track and not on either side of the preformed track. This control may be obtained by preforming the track to define a pair of tapered walls and by directing a light beam toward the preformed track to obtain the passage of light from each of the tapered walls. A control signal is produced in accordance with the relative amount of light passing from each of the walls. This control signal is used to vary the position of the light beam relative to the track so that an equal amount of light passes from each of the tapered walls defining the track.

The invention also includes a reproducing system wherein light energy is directed towards the thermoplastic material to be modified in accordance with the deformed surface structure of the recording medium along the preformed track. The invention further includes a means to control the beam of light energy directed towards the medium to insure a proper tracking of the information recorded along the preformed track. Such control means in the reproducing system may be similar to the control means in the recording system. Further explanations of the recording and reproducing systems are given in conjunction with the description of the following figures wherein:

Figure 1:
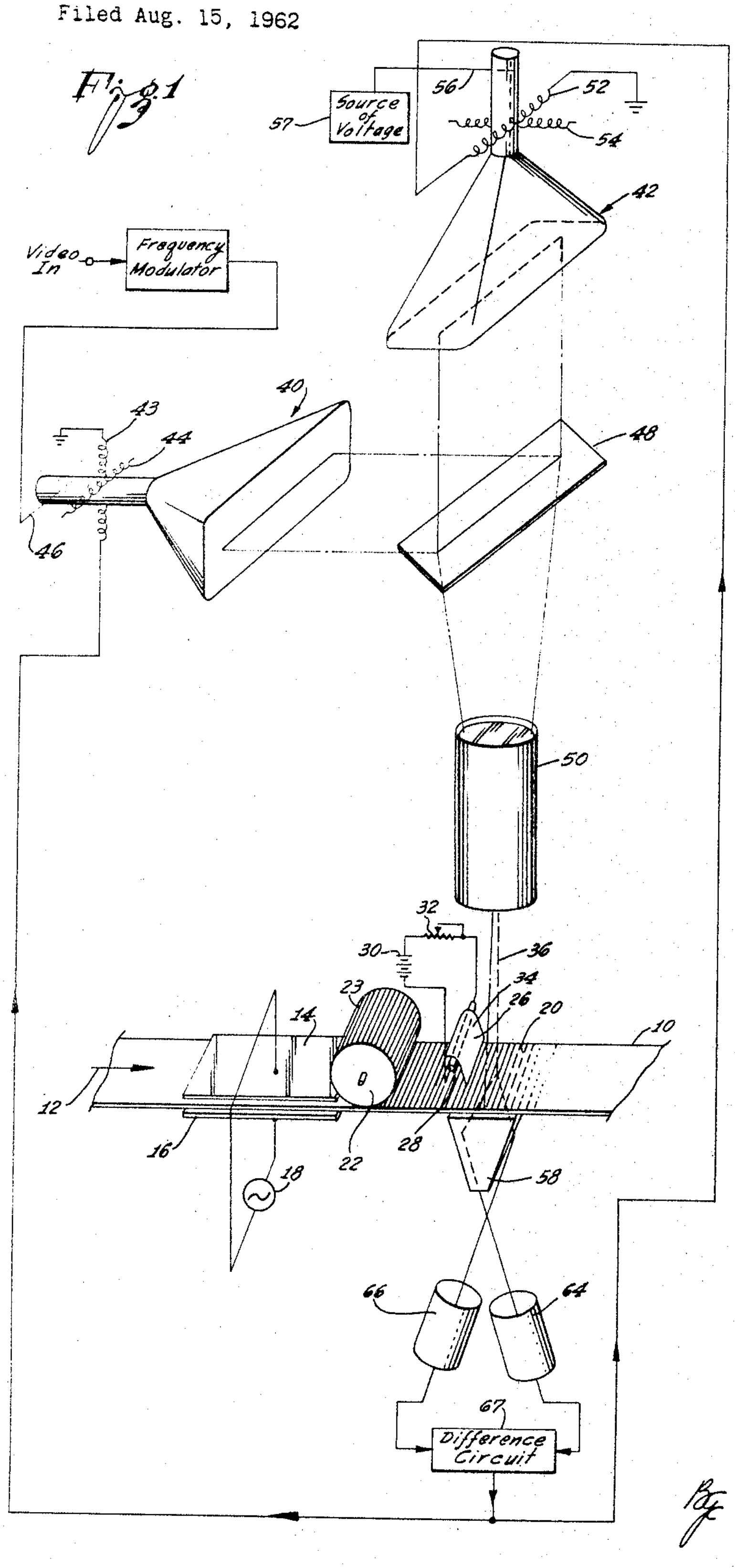
FIGURE 1 shows the components included in the recording and reproducing system and the interrelationship of the components to produce a recording of information on a thermoplastic medium such as a tape and a subsequent reproduction of the information from the tape.

During recording, a medium such as a tape 10 is moved in a longitudinal direction indicated by an arrow 12 in FIGURE 1. The tape may be unwound from a supply spool (not shown) and wound on a takeup spool (not shown) in a conventional manner and may be provided with a drive system normally associated with a tape transport. As the tape 10 moves in a longitudinal direction, it passes between a pair of plates 14 and 16. The plates may be made of conductive material to provide a capacitance between the plates. A signal generator 18 supplies a radio frequency signal across the plates 14 and 16. The RF energy produced by the generator 18 is partly absorbed by the tape 10 as the tape moves between the plates. The RF energy therefore heats the tape 10 to a temperature dependent upon the strength of the signals from the signal generator 18 and the resistance of the tape 10.

The tape 10 has one side covered with thermoplastic material 20. The material 20 exhibits characteristics of passing from a solid state to a plastic state, when subjected to a sufficient quantity of heat. The signal generator 18 is designed to provide sufficient energy to convert the material 20 to a plastic state as the tape 10 passes between the plates. The tape then passes under a pressure drum 22 which is provided with a series of serrations 23 across the outside surface of the drum in a direction substantially perpendicular to the direction of movement of the tape. The drum is positioned against the tape 10 so that the thermoplastic material 20 of the tape becomes serrated in accordance with the surface pattern of the serrations 23 on the drum. The mass of the drum 22 is sufficient to absorb heat from the tape 10 for reducing the temperature of the thermoplastic material 20 below that required to maintain the material in a plastic state. The thermoplastic material 20 accordingly becomes converted to a solid state as the thermoplastic material moves past the drum 22. The serrated surface of the tape 10 can be seen in FIGURE 2 wherein the serrations are shown as a series of V-shaped ridges 24 extending transversely across the tape. Each of the ridges defines a preformed track along which the information is subsequently recorded. As will be seen, each of the ridges 24 is defined by a pair of upwardly extending walls **24*a* and 24*b*** which taper toward each other with progressive distances from the body of the tape.

As the tape 10 passes from the drum 22, it is subjected to heat from a surface heater 26. The surface heater may include a heat producing element 28 such as a resistance coil and may be provided with a source of energy such as a battery 30 connected to supply energy to the element 28. A variable attenuator 32 such as an adjustable rheostat is in series with the battery so as to provide a control of the amount of heat which the element 28 produces. A reflector 34 is provided to direct substantially all of the heat energy to the surface of the tape 10. The heater is designed to produce sufficient energy to heat the thermoplastic material 20 on the surface of the tape 10 to a temperature just below that necessary for the thermoplastic material 20 to change from its solid to its plastic state.

While in the heated condition, the tape 10 is subjected to a beam of energy 36 at a localized position on the tape. The beam of energy is varied in accordance with variations in the information to provide variable heating characteristics for increasing the surface temperature of the thermoplastic material 20 to a value to produce a plastic state of the material. When the thermoplastic material is subjected to the localized beam 36 of a proper intensity to produce a plastic state of the thermoplastic material 20, the upwardly extending ridges 24 on the thermoplastic material 20 are flattened. The flattened portions are shown in detail in FIGURE 2 and are generally indicated as 38.

The beam of energy 36 may include two components which are produced by two electron tubes designated 40 and 42. The tube 40 produces infrared energy at its face to supply the heating effect of the beam 36. The position of the beam produced by the tube 40 is controlled in horizontal and vertical directions by coils 43 and 44. The intensity of the beam of energy is controlled by a grid 46. The beam of infrared energy passes from the face of the tube 40 and is directed towards a beam splitting mirror 48. A portion of the infrared energy is reflected from the beam splitting mirror 48 and is impressed on a reducing lens 50. The reducing lens is designed to condense the infrared energy into a narrow beam to be directed along the preformed tracks 24 on the tape 10.

The tube 42 produces light energy in the visible spectrum at the face of the tube and includes coils 52 and 54 to control the vertical and horizontal deflection of the light energy. The intensity of the visible energy is regulated by a grid 56. For example, a source of voltage 57 is adjusted to provide a proper intensity of light at the face of the tube 42. The light from the tube 42 is also impressed on the beam splitting mirror 48 which passes a portion of the light energy to the reducing lens 50. The lens 50 condenses the light energy into a narrow beam to be directed along the preformed tracks 24. As illustrated in the embodiment of FIGURE 1, the energy produced by the tube 40 and that produced by the tube 42 are superimposed one on the other as a single beam of energy 36. Therefore the two sources of energy are both directed along the preformed tracks 24 at the same position. It will be appreciated however that the beams of energy may also be at a fixed spatial relationship to each other without departing from the concepts of the invention.

The beam of energy 36 is split into two components 60 and 62 as it strikes the V-shaped portions **24*a* and 24*b* of the upwardly extending ridge 24 and passes through the tape 10. The two components 60 and 62 of the energy beam then pass through the prism 58 and are refracted in a manner similar to that shown in FIGURE 2 so as to cross each other at some position below the prism 58. The components are detected individually by a pair of photo multipliers 64 and 66. The photo multiplier tubes 64 and 66 are designed to detect the visible light portion of the beam of energy 36, so as to produce a control signal in accordance with the difference in the outputs of the two photo multiplier tubes 64 and 66**.

During recording of information on the thermoplastic tape 10, the infrared energy is controlled to sweep as a flying spot across the face of the tube 40. The coil 44 controls the horizontal movement of the infrared energy in the direction along the ridges 24. The infrared energy therefore sweeps transversely across the tape 10 in a direction corresponding to the ridges of the tape as the tape moves in the longitudinal direction. The coil 52 associated with the tube 42 produces a horizontal movement of the visible light produced by tube 42 in synchronism with the horizontal movement of the beam of infrared energy. The composite beam of energy 36 therefore tracks transversely across the tape 10.

The grid of the tube 40 is varied in accordance with the information to control the intensity of the infrared energy. This variation in the intensity of the infrared energy may occur in a digital manner on a frequency modulated basis to produce discrete flattening of the upwardly extending ridges 24 at successive positions along the ridges. The frequency at which the discrete points of flattening occur is varied in accordance with the amplitude of the information to be recorded. For example, the flattened areas may be recorded with a frequency of approximately 4.3 megacycles per second to indicate the presence of black in a video signal. In the same manner, flattened areas at a frequency of approximately 6.8 megacycles per second may indicate that white is present in the video signal.

Figure 2:
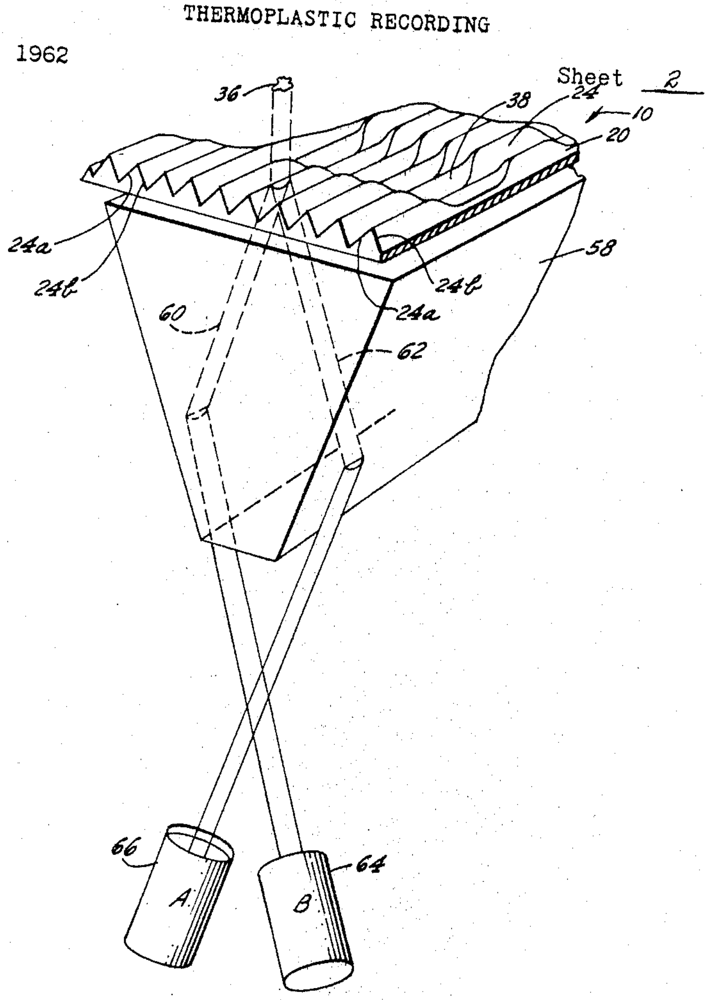
FIGURE 2 is an enlarged fragmentary perspective view of the thermoplastic tape after the recording of information on a plurality of tracks on the tape by the system shown in FIGURE 1 and includes means for controlling the disposition of the tracks on the tape relative to the recording system shown in FIGURE 1.

While the information is being recorded by the infrared energy produced by the tube 40, the visible energy produced by the tube 42 is used to control the direction of the beam 36 to individually track along each upwardly extending ridge 24 on the tape 10. As illustrated in FIGURE 2, when the beam is perfectly centered over the V-shaped portion defined by the walls **24*a* and 24*b* of the upwardly extending ridge 24, the beam is split into two equal components 60 and 62. These components are individually detected by the photo multipliers 64 and 66 and are impressed on a difference circuit 67 to indicate when the difference between the two output signals from the photo multipliers 64 and 66 is other than zero. When the beam is striking perfectly along the top of the ridge, the difference between the signals produced by the photo multipliers 64 and 66 is zero and the vertical coils 43 and 52 exercise no control over the positioning of the corresponding beams of energy in a direction corresponding to the arrow 12 in FIGURE 1. However, when the beam is displaced from the track defined by one of the ridges 24, the two components 60 and 62 are unequal so that a difference signal is produced by the circuit 67 as a result of the differences in the outputs of the photomultipliers 64 and 66. This signal is used to control the deflection of the beams within the tubes 40 and 42 in the direction corresponding to the arrow 12** in FIGURE 1 so as to track along the upwardly extending ridge 24. In this way, the beams 40 and 42 are maintained at a position to pass equal amounts of light from the walls 24*a* and 24*b* of the ridge 24.

Figure 3:
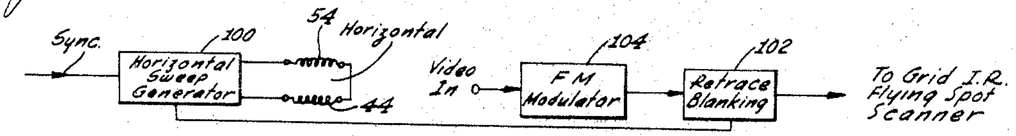
FIGURE 3 is a diagram, partly in block form, of circuitry for recording information on the thermoplastic tape including circuitry for directing a beam of energy toward the tape.

In FIGURE 3, a sync signal is applied to a horizontal sweep generator 100 to control the frequency of the output signal from the horizontal sweep generator, this output signal having a saw tooth characteristic. During the recording of the information by the system shown in FIGURE 1 and described above, the output signal from the generator 100 is introduced to the horizontal deflection coils 44 and 54 to control the sweep of the beam across the face of the tubes in accordance with the upward slope of the saw tooth wave and to provide a rapid retrace of the beam during the downward slope of the saw tooth wave. The output signal from the horizontal sweep generator 100 also controls circuitry indicated as 102 to blank out the information during the period of retrace. The signal from the circuitry 102 is introduced to the grids 46 and 56 of the tubes 40 and 42 to blank out the beams in the tubes during the horizontal retrace of the beams.

The information signal such as a video signal is applied to a frequency modulator 104 which is connected to the grids 46 and 56 to control the output from the tubes 40 and 42 on a digital basis. For example, when the modulator 104 has a relatively high output, beams are produced by the tubes 40 and 42 but no beams are produced by the tubes 40 and 42 when the output from the modulator 104 is relatively low. The frequency of the alternate production of the high and low outputs in the modulator 104 is varied in accordance with the intensity of the information signal such as the video signal. As previously described, the flattened portions 38 are produced in the ridges 24 only during the times that the output from the modulator 104 is relatively high.

Figure 4:
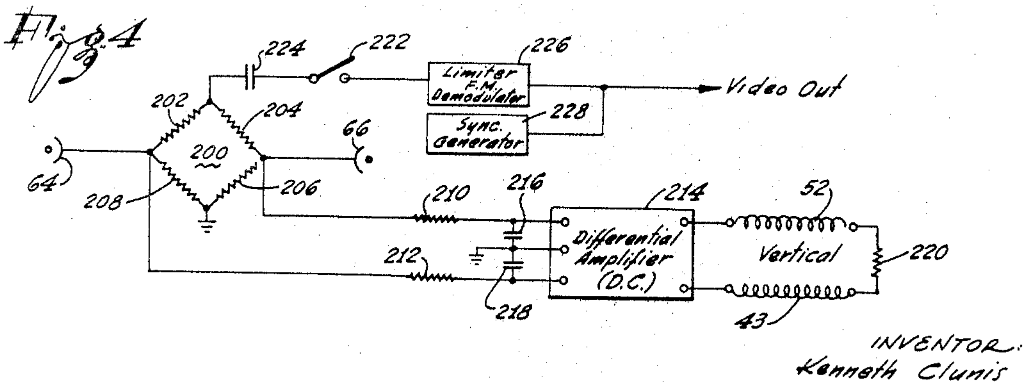
FIGURE 4 is a diagram, partly in block form, of circuitry for controlling the direction of the beam of energy and for reproducing information previously recorded on the medium.

FIGURE 4 illustrates in detail the difference circuitry 67 shown in block form in FIGURE 1 and described for controlling the operation of the vertical deflection coils 42 and 44. The outputs from the photo multipliers 64 and 66 illustrated in FIGURES 1 and 2 are applied across the two arms of a bridge circuit 200. The bridge circuit includes four resistances 202, 204, 206 and 208. The outputs from the photomultipliers 64 and 66 are also individually applied through resistances 210 and 212 to a differential amplifier 214. A pair of capacitors 216 and 218 are respectively connected from the inputs of the differential amplifier 214 to a reference potential such as ground.

The resistances 210 and 212 and the capacitors 216 and 218 serve as a pair of integrators to integrate the pulses respectively applied to the differential amplifier 214 from the photocell tubes 64 and 66. The differential amplifier 214 operates on a DC basis to provide an output signal in accordance with any difference in the signals applied to the two inputs of the amplifier. The output from the differential amplifier 214 is used as a control signal to regulate the operation of the coils 43 and 52 in controlling the vertical deflection in the tubes 40 and 42. A resistance 220 may be inserted in series with the coils 43 and 52 to limit the current flowing through the coils.

When the beam of energy 36 illustrated in FIGURE 2 is not centered between the tapered walls 24*a* and 24*b* of the ridge 24, the beams of energy 60 and 62 have unequal values. The photomultipliers 64 and 66 therefore produce unequal output signals. The differential amplifier produces a control signal in accordance with a difference between the unequal output signals to regulate the vertical deflection coils for centering the beam of energy 36 on the peak of the ridge 24.

During reproduction of the information, the tube 40, the signal generator 18, the drum 22 and the heater 26 are all rendered inoperative. The tube 42 produces a visible beam which is scanned transversely across the tape 10 as the tape moves in the longitudinal direction. The beam of visible energy is modified in accordance with the disposition of flattened or non-flattened portions along the extending ridges on the tape 10. When the ridge 24 has a V-shaped appearance, the light energy is split into two components 60 and 62 as illustrated in FIGURE 2, and these components are detected by the photo multipliers 64 and 66. When the light beam strikes flattened portions 38 along the upwardly extending ridge 24, the light beam passes directly through the tape 10, the prism 58 and passes between the photomultiplier tubes 64 and 66 so that no signals are produced by the photomultiplier tubes.

As indicated previously, the difference between the outputs of the two photomultipliers 64 and 66 is used to provide a control signal to insure a proper tracking along the ridge 24 of the light beam produced by the tube 42. The sum of the output signals from the photomultipliers 64 and 66 represents the information signal recorded on the tape 10. The information therefore consists of a series of on-off output pulses having a frequency in accordance with the amplitude of the information. The pulses are off during the movement of the light beam along the flattened portion 38 of the ridges 24, and the pulses are on during the movement of the light beam along the V-shaped portion of the ridges.

FIGURE 4 illustrates in some detail means for reproducing the information recorded on the thermoplastic medium 10. During reproduction, a switch 222 is closed to allow energy coupled through the capacitor 224 to be applied to a limiter and FM demodulator 226. The input to the limiter and FM demodulator 226 represents the sum of the outputs from the photomultiplier tubes 64 and 66. The output from the sync generator 228 is coupled in parallel with the output signal from the limiter and FM demodulator 226 to reconsitute the information signal, such as the video signal.

Figures 5, 6, 7:
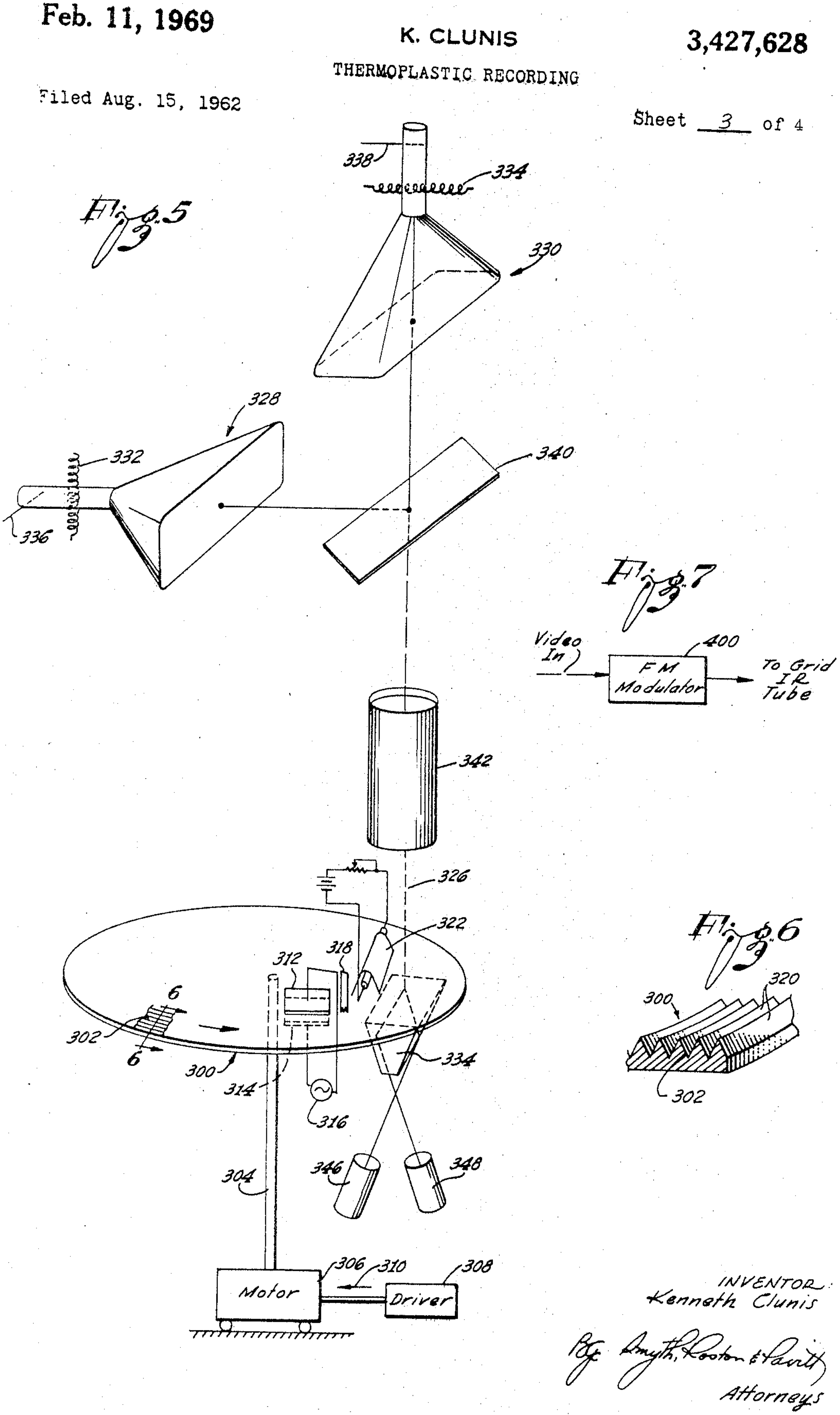
FIGURE 5 is a second embodiment of the invention for the recording and subsequent reproduction of information on a thermoplastic disc.
FIGURE 6 is an enlarged fragmentary portion of the thermoplastic disc shown in FIGURE 5 as seen from a position corresponding substantially to the line 6—6 of FIGURE 5.
FIGURE 7 is a block diagram of particular circuitry for obtaining a recording of information on the thermoplastic disc shown in FIGURE 5.

FIGURE 5 illustrates a second embodiment of the invention for use with a medium such as a disc 300 having a layer of themoplastic material 302. As illustrated in FIGURE 5, the disc 300 is rotated through a shaft 304 by a motor 306. As the disc rotates, it is driven by a driver 308 in an axial direction indicated by an arrow 310. For a full explanation of a rotation and driving system such as illustrated in FIG. 5, reference is made to copending application Ser. No. 195,218 filed May 16, 1962, by David Paul Gregg and assigned to the assignee of the instant application.

A pair of conductive plates 312 and 314 are disposed on opposite sides of the disc 300. A signal generator 316 supplies radio frequency energy between the plates 312 and 314 to heat the surface of the disc 300 until the thermoplastic material 302 on the disc reaches its plastic state. A tool member 318 having a W-shaped tip is disposed in contact with the thermoplastic material 302 to provide a grooved surface in the thermoplastic material 302 while the thermoplastic material is in the plastic state. The grooved surface follows a spiral track since the disc rotates and is moved transversely. For example, the grooved surface is shown more clearly with reference to FIGURE 6, which illustrates the disc 300, the thermoplastic material 302 and a spiral ridge 320. The surface of the disc 300 is allowed to cool to fix the preformed spiral track on the disc 300.

During recording of information on the thermoplastic material 302 of the disc 300, a heater element 322 is disposed above the disc 300 to operate in a manner similar to that of the heater element 26 shown in FIGURE 1. The upwardly extending preformed ridge 320 on the disc 300 is subjected to a beam of energy 326 to deform the ridge at selected portions along the ridge. The beam 326 is composed of infrared energy and light energy in the same manner as the beam 36 illustrated in FIGURE 1. Tubes 328 and 330 respectively provide the infrared and visible energy which forms the beam 326. The tubes 328 and 330 are provided with vertical deflection coils 332 and 334, and grids 336 and 338. The energies from the tubes 328 and 330 pass through a beam splitting mirror 340 for focussing by a lens system 342. The beam 326 is split into two components in a manner similar to that shown in FIGURE 2 and is directed by a prism 344 to a pair of photomultiplier tubes 346 and 348.

As illustrated in FIGURE 7, information such as video information is applied directly to an FM modulator 400 to control the voltages introduced to the grid 336 of the tube 328. The beam 326 operates in the same manner as the beam 36 illustrated in FIGURES 1 and 2 to control the operation of vertical coils 332 and 334 during recording and reproduction of the information. The control circuitry for recording and reproduction of the information is therefore identical to that shown in FIGURE 4. Also the reproducing system as illustrated in FIGURE 4 may be used for either the embodiment shown in FIGURE 1 or that shown in FIGURE 5.

Figure 8:
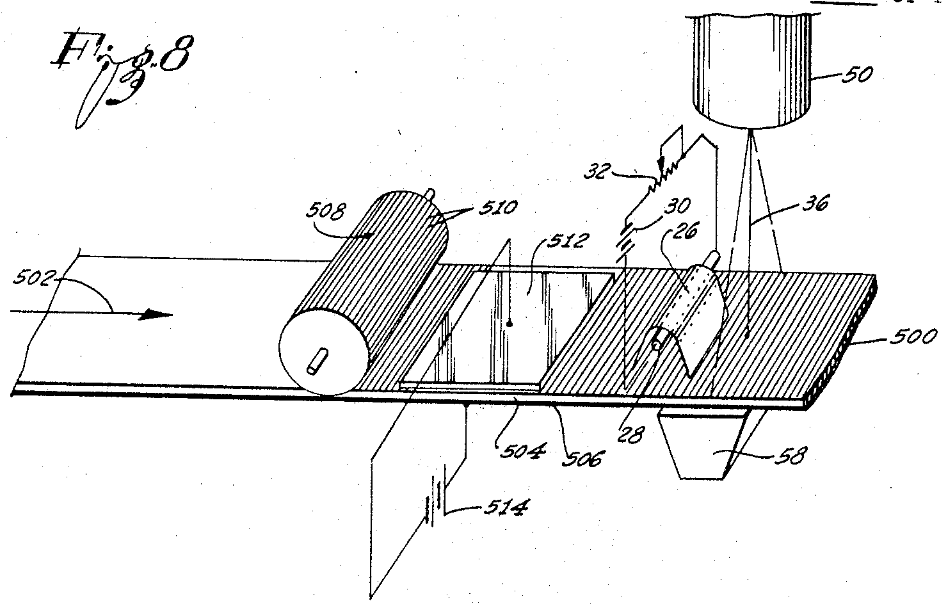
FIGURE 8 is a portion of a third embodiment of a recording system similar to the recording system of FIGURE 1.

FIGURE 8 shows a third embodiment of the invention similar to FIGURE 1 and elements having the same function are given the same reference character. A tape 500 is moved in a longitudinal direction as indicated by the arrow 502. The top surface of the tape 500 is composed of thermoplastic material 504. The bottom surface of the tape 500 has a thin coating of conductive material 506. For example, the coating 506 may be a film of aluminum oxide.

The tape passes under a pressure drum 508 which is provided with a series of serrations 510 across the outside surface of the drum. The serrations 510 are used to cold form the surface of the tape to have a series of upwardly extending ridges as shown in FIGURE 2.

As the tape 500 continues to move in the longitudinal direction, it passes under a plate 512. The plate 512 may be made of conductive material. A source of DC voltage 514 supplies energy across the plate 512 and the conductive coating 506 on the bottom side of the tape 10 to charge the surface 504 of the tape 500 in accordance with the value of the source 514. The tape 500 therefore has a uniform charge over the entire thermoplastic surface 504. The tape 500 then passes under a surface heater 26 which has similar characteristics to the surface heater 26 illustrated in FIGURE 1.

The tape 500 is then subjected to the beam of energy 36 for heating the thermoplastic material at selected portions along the tape to a sufficient temperature to have the thermoplastic material in a plastic state. Due to the static charge between the surface of the tape 500 and the conductive coating 506, the selective portions along the ridges are attracted to the conductive coating to flatten the ridges at the selective portions.

The rest of the recording system is similar to that shown in FIGURE 1. The main difference between the two recording systems is the use of an additional static charge attraction with the recording system of FIGURE 8 to provide the flattening of the selected portions along the ridges. The thermoplastic tape 500 as recorded by the system of FIGURE 8 may be reproduced in the same manner as the tape 10 recorded by the ssytem of FIGURE 1.

Figure 9:
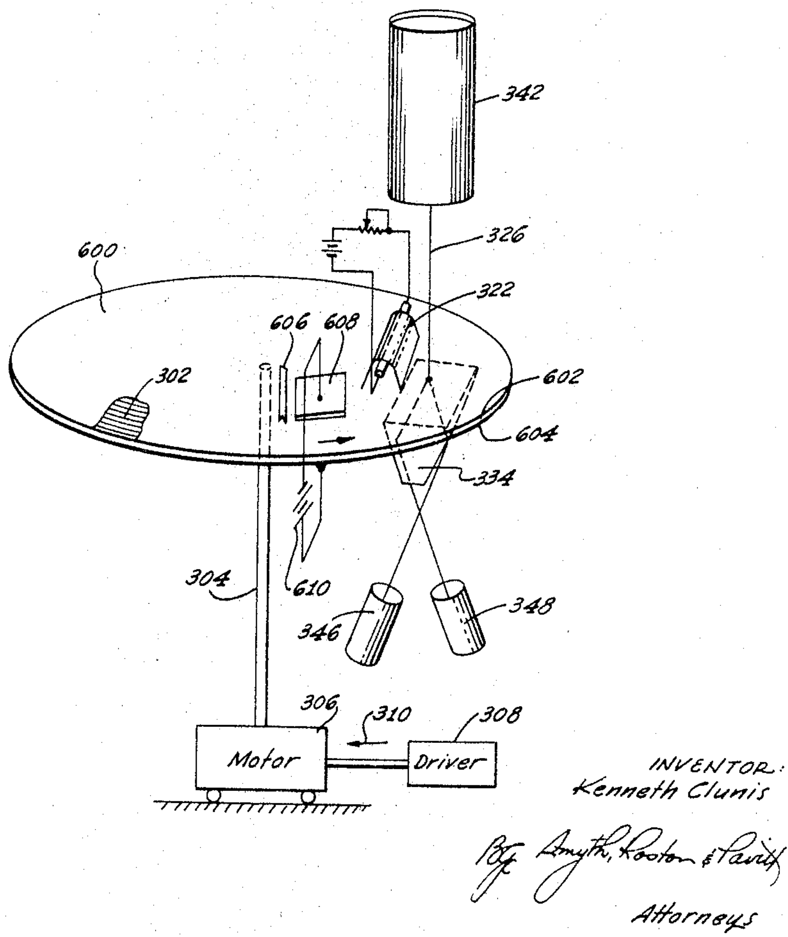
FIGURE 9 is a portion of a fourth embodiment of a recording system similar to the recording system of FIGURE 5.

FIGURE 9 illustrates a recording system having the same relationship to the system of FIGURE 5 as the recording system of FIGURE 8 has to the system of FIGURE 1. A disc 600 is rotated and moved in a transverse direction 310 by a motor 306 and a driver 308. The disc 600 has a thermoplastic surface 602 on the top of the disc and a thin conductive coating 604 on the bottom of the disc. A W-shaped tool 606 is used to cold form a spiral upwardly extending ridge on the thermoplastic surface of the disc as indicated at 302.

The disc 600 also moves under a conductive plate 608. A DC voltage source 610 is connected between the plate 608 and the conductive coating 604 to provide a constant charge on the surface of the disc. The thermoplastic disc is then heated by the heater 322 in the same manner as described with reference to FIGURE 5. The beam of energy 326 softens the spiral ridge at selective positions along the ridge, and the static charge attraction provides a flattening of the ridge at these positions.

The rest of the recording system is similar to that shown in FIGURE 5, and the disc as recorded by the system shown in FIGURE 9 may be reproduced in the same manner as a disc recorded by the system as shown in FIGURE 5. The recording systems of FIGURES 8 and 9 constitute an improvement over the recording systems of FIGURES 1 and 5 since they include the additional force of the static charge attraction to provide the flattening of the upwardly extending ridges.

What is claimed is:

1. A method of recording and reproducing information on a medium having a thermoplastic layer on one surface of the medium and having an upwardly extending ridge on the thermoplastic layer to serve as a recording surface, including the steps of:
providing a movement of the medium in a particular direction,
providing a first beam of energy having characteristics in accordance with the characteristics of the information and with the first beam of energy providing a heating of the thermoplastic layer on the medium,
directing the first beam of energy toward the upwardly extending ridge on the medium during the movement of the medium in the particular direction to vary the surface characteristics along the upwardly extending ridge on the medium in accordance with the characteristics of the first beam of energy,
providing a second beam of energy, and
directing the second beam of energy toward the ridge on the medium to produce variations in the characteristics of the second beam of energy passing from the medium in accordance with the surface characteristics of the ridge.

2. A method of recording and reproducing information on a medium having a thermoplastic layer on one surface of the medium and having an upwardly extending ridge on the thermoplastic layer to serve as a recording surface, including the steps of:
providing a movement of the medium in a particular direction,
providing a first beam of energy having characteristics in accordance with the characteristics of the information and with one component of the first beam of energy providing a heating of the thermoplastic layer on the medium,
directing the first beam of energy toward the upwardly extending ridge on the medium during the movement of the medium in the particular direction to vary the surface characteristics along the upwardly extending ridge on the medium in accordance with the characteristics of the first beam of energy,
detecting any variations in the relative positions of the first beam of energy and the upwardly extending ridge on the medium to produce a first control signal having characteristics in accordance with such variations,
regulating the direction of the first beam of energy in accordance with the first control signal to have the first beam of energy track along the upwardly extending ridge,
providing a second beam of energy,
directing the second beam of energy toward the upwardly extending ridge on the medium to produce variations in the characteristics of the second beam of energy passing from the medium in accordance with the surface characteristics of the ridge,
detecting any variations in the relative position of the second beam of energy and the upwardly extending ridge on the medium to produce a second control signal having characteristics in accordance with such variations, and regulating the direction of the second beam of energy in accordance with the second control signal to have the second beam of energy track along the upwardly extending ridge.

3. In combination in a system for recording information on a recording medium having a thermoplastic layer on one surface of the medium, first means operatively coupled to the medium for obtaining a movement of the medium in a first direction, second means for producing energy, third means disposed relative to the medium and responsive to the energy produced by the second means for heating the thermoplastic layer on the medium to a thermoplastic state, fourth means operatively coupled to the medium during the thermoplastic state of the thermoplastic layer for forming a ridge extending upwardly from the one surface of the medium to serve as a recording track on the medium, and fifth means operatively coupled to the recording medium for recording information on the ridge formed on the thermoplastic layer.

4. In combination in a system for recording information on a recording medium having a thermoplastic layer on one surface of the medium, first means operatively coupled to the medium for obtaining a movement of the medium in a first direction, second means operatively coupled to the thermoplastic layer on the one surface of the medium during the movement of the medium in the first direction for forming a ridge extending upwardly from the one surface of the medium to serve as a recording track on the medium, third means operatively coupled to the thermoplastic layer on the one surface of the medium for providing an electrostatic charge on the surface of the thermoplastic layer, and fourth means operatively coupled to the recording medium for recording information on the ridge formed on the thermoplastic layer.

5. In combination in a system to record information on a movable medium having a thermoplastic layer of material on one surface of the medium and having an upwardly extending ridge on the thermoplastic layer to serve as a recording surface with an electrostatic charge present on the recording surface of the medium, first means operatively coupled to the medium for providing a movement of the medium in a particular direction, second means responsive to the information for providing a beam of energy having characteristics in accordance with the characteristics of the information to provide a heating of the thermoplastic layer on the medium, and third means operatively coupled to the second means for directing the beam of energy toward the upwardly extending ridge on the medium during the movement of the medium in a particular direction for heating progressive portions along a ridge in accordance with the characteristics of the beam of energy to flatten portions of the ridge in representation of the information by a force produced by the electrostatic charge on the surface of the medium.

6. In combination in a system to record information on a movable recording disc having a thermoplastic layer of material on one surface of the disc and having an upwardly extending spiral ridge on the thermoplastic layer on the disc to serve as a recording track on the disc, first means operatively coupled to the disc for providing a rotary movement of the disc, second means responsive to the information for providing a beam of infrared energy having characteristics in accordance with the characteristics of the information to provide a heating of the thermoplastic layer on the disc, and third means operatively coupled to the second means for directing the beam of infrared energy along the upwardly extending spiral ridge on the disc during the rotary movement of the disc for heating progressive positions along the spiral ridge in accordance with the characteristics of the infrared beam of energy to flatten portions of the spiral ridge in representation of the information.

7. In combination in a system to record information on a medium having a thermoplastic layer of material on one surface of the medium and having an upwardly extending ridge on the thermoplastic layer to serve as a recording surface, first means operatively coupled to the medium for providing a movement of the medium in a particular direction, second means operatively coupled to the medium for providing an electrostatic charge on the recording surface of the medium, third means responsive to the information for providing a beam of energy having characteristics in accordance with the characteristics of the information to provide a heating of the thermoplastic layer on the medium, and fourth means operatively coupled to the second means for directing the beam of energy toward the upwardly extending ridge on the medium during the movement of the medium in the particular direction for heating progressive positions along the ridge in accordance with the characteristics of the beam of energy to flatten portions of the ridge in representation of the information by a force produced by the electrostatic charge on the surface of the meduim.

8. In combination in a system to record information on a movable medium having a thermoplastic layer of material on one surface of the medium and having a preformed upwardly extending ridge on the thermoplastic layer to serve as a recording surface, first means operatively coupled to the medium for providing a movement of the medium in a particular direction, second means responsive to the information for providing a beam of energy having characteristics in accordance with the characteristics of the information to provide a heating of the thermoplastic layer on the medium, third means operatively coupled to the second means for directing the beam of energy toward the preformed ridge on the medium during the movement of the medium to vary the surface characteristics along the preformed ridge on the medium in accordance with the characteristics of the beam of energy, fourth means disposed relative to the medium and responsive to variations in the relative position of the beam of energy and the preformed ridge on the medium to produce a control signal in accordance with such variations, and fifth means operatively coupled to the third means and responsive to the control signal for controlling the direction of the beam of energy toward the preformed ridge to compensate for variations in the position of the beam of energy relative to the preformed ridge to provide a recording of the information along the preformed ridge.

9. In combination in a system to record information on a movable medium having a thermoplastic layer of material on one surface of the medium and having a preformed upwardly extending ridge on the thermoplastic layer to serve as a recording surface, first means operatively coupled to the medium for providing a movement of the medium in a particular direction, second means responsive to the information for directing a first beam of energy toward the preformed ridge on the medium during the movement of the medium and with the characteristics of the beam of energy varied in accordance with the characteristics of the information to provide a heating of the thermoplastic layer on the medium for varying the surface characteristics along the preformed ridge, third means for directing a second beam of energy toward the preformed ridge on the medium with the second beam of energy having a fixed spatial relationship with the first beam of energy, fourth means disposed relative to the medium and responsive to variations in the relative position of the second beam of energy and the preformed ridge on the medium to produce a control signal in accordance with such variations, and fifth means operatively coupled to the second means and responsive to the control signal for regulating the direction of the first beam of energy toward the preformed ridge to compensate for variations in the position of the first beam of energy relative to the preformed ridge to provide a recording of the information along the preformed ridge.

10. In combination in a system for reproducing information recorded at successive positions along a preformed upwardly extending ridge on a thermoplastic layer on one surface of a medium where the information has been recorded on the preformed ridge as variations in the surface characteristics of the ridge, first means for providing a beam of energy, second means operatively coupled to the first means and disposed relative to the medium for directing the beam of energy toward the preformed ridge on the medium to produce variations in the characteristics of the beam of energy passing from the medium in accordance with the surface characteristics of the ridge, means operatively coupled to the medium for providing a movement of the medium relative to the beam of energy to reproduce the information recorded at successive positions along the preformed ridge, and means disposed relative to the medium and responsive to the beam of energy passing from the medium for producing an output signal in accordance with the characteristics of the beam of energy to reproduce the information recorded on the medium.

11. In combination in a system for reproducing information recorded at successive positions along a preformed upwardly extending ridge on a thermoplastic layer on one surface of a medium where the information has been recorded on the preformed ridge as variations in the surface characteristics of the ridge, first means for providing a beam of energy, second means operatively coupled to the first means and disposed relative to the medium for directing the beam of energy toward the preformed ridge on the medium to obtain variations in the amount of energy passing from the medium in accordance with variations in the characteristics of the ridge, means operatively coupled to the medium for moving the medium relative to the beam of energy to provide a reproduction of the information recorded at successive positions along the preformed ridge, third means disposed relative to the medium for detecting variations in the relative position of the beam of energy and the preformed ridge on the medium to produce a control signal in accordance with such variations, fourth means operatively coupled to the second and third means and responsive to the control signal for regulating the direction of the beam of energy toward the medium to follow the preformed ridge on the medium, and fifth means disposed relative to the medium and responsive to the beam of energy passing from the medium for producing an output signal in accordance with the characteristics of such beam of energy to obtain a reproduction of the information recorded on the medium.

12. The combination as in claim 11 wherein the beam of energy is split into two components upon the passage of the beam to the preformed upwardly extending ridge and wherein the third means is responsive to the two components of the energy beam to produce the control signal in accordance with the difference between the two components of the beam of energy.

13. The combination as in claim 11 wherein the beam of energy is split into two components upon the passage of the beam to the preformed upwardly extending ridge and wherein the fifth means is responsive to the two components of the energy beam for producing the output signal in accordance with the sum of the components.

14. In combination in a transducing system including a movable medium having a thermoplastic layer of material on one surface of the medium and having a preformed upwardly extending ridge on the thermoplastic layer to serve as a recording surface, first means operatively coupled to the medium for providing a movement of the medium in a particular direction, second means for providing a beam of energy, third means disposed relative to the medium for directing the beam of energy toward the preformed ridge on the medium, fourth means disposed relative to the medium and responsive to variations in the relative position of the beam of energy and the preformed ridge on the medium to produce a control signal in accordance with such variations, fifth means operatively coupled to the third means and responsive to the control signal for regulating the direction of the beam of energy toward the medium to follow the preformed ridge on the medium.

15. The combination as in claim 14 wherein the beam of energy is split into two components upon the passage of the beam to the preformed upwardly extending ridge and wherein the third means is responsive to the two components of the beam of energy to produce the control signal in accordance with the difference between the two components of the beam of energy.

References Cited

UNITED STATES PATENTS

| | | | |
|---|---|---|---|
| 2,000,527 | 5/1935 | Linderman | 346—135 |
| 2,156,289 | 5/1939 | Hoy | 346—135 |
| 3,084,334 | 4/1963 | Martin | 340—173 |
| 3,085,231 | 4/1963 | Linder | 340—173 |

RICHARD B. WILKINSON, *Primary Examiner.*

J. W. HARTARY, *Assistant Examiner.*

U.S. Cl. X.R.

346—77; 340—173; 178—6.6